United States Patent

Kummer

[11] 4,233,266
[45] Nov. 11, 1980

[54] BULK PASTEURIZATION OF MUSHROOM COMPOST

[76] Inventor: David A. Kummer, P.O. Box 271, Elburn, Ill. 60119

[21] Appl. No.: 943,135

[22] Filed: Sep. 18, 1978

[51] Int. Cl.³ .................... B01J 19/00; C05F 11/08; C12M 1/04
[52] U.S. Cl. .......................... 422/184; 71/5; 71/9; 55/494; 34/225; 422/234; 422/239
[58] Field of Search ............ 71/5, 8, 9; 422/184, 422/234, 239, 275, 187, 177, 211; 34/225; 47/1.1; 195/142; 220/408; 55/494, 263, 338; 99/474; 435/313

[56] References Cited

U.S. PATENT DOCUMENTS

| | | | |
|---|---|---|---|
| 1,808,383 | 6/1931 | Steves | 47/1.1 |
| 2,062,264 | 11/1936 | Goldsborough | 71/8 X |
| 2,584,727 | 2/1952 | Mellen | 34/225 |
| 2,627,838 | 2/1953 | Huggins | 34/225 |
| 2,723,493 | 11/1955 | Stoller | 71/5 X |
| 3,954,422 | 5/1976 | Mentschel | 422/211 |
| 4,125,394 | 11/1978 | Wilson | 71/9 |

Primary Examiner—Michael S. Marcus
Attorney, Agent, or Firm—Edmond T. Patnaude

[57] ABSTRACT

A compost mixture for growing Agaricus birporus mushrooms is placed within a perforated fence surrounding a perforate portion of a floor in an enclosed space, and warm moist air is circulated up and out through the compost throughout the pasteurization process thereby maintaining the pressure in said space above that of the ambient while controlling the temperature and moisture content of the compost throughout a Phase II pasteurization process.

2 Claims, 3 Drawing Figures

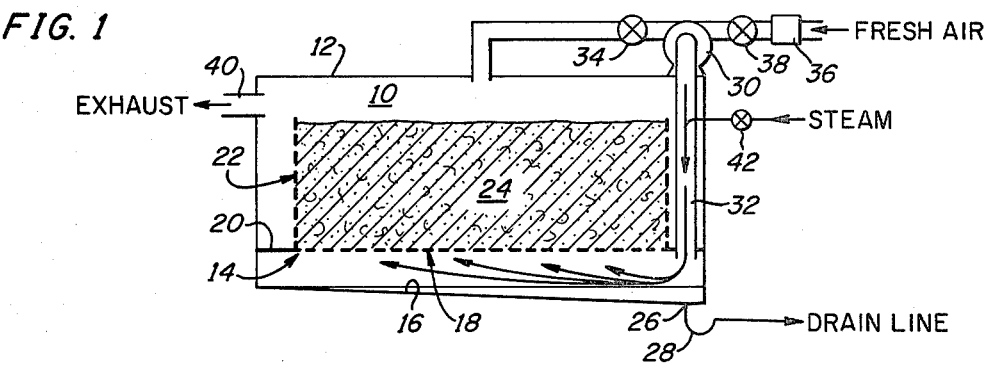
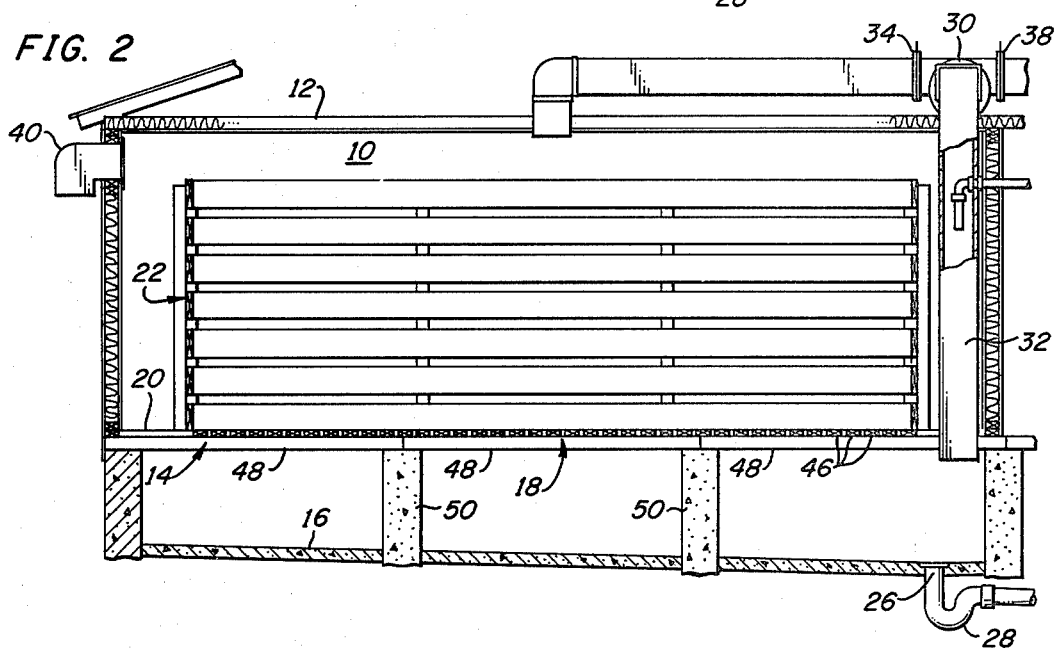
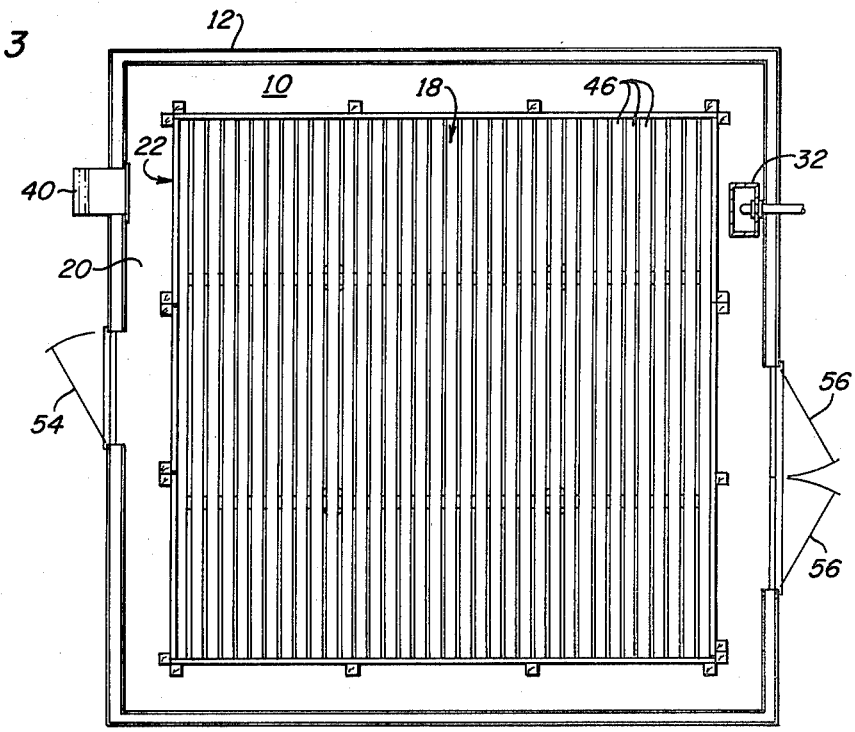

BULK PASTEURIZATION OF MUSHROOM COMPOST

The present invention relates in general to the art of preparing compost for the culture of Agaricus bisporus, and it relates in particular to a novel bulk Phase II pasteurization system and chamber wherein a controlled mixture of air and steam is caused to flow uniformly through a large mass of compost.

BACKGROUND OF THE INVENTION

In the past, mushroom compost has been prepared by initially mixing the ingredients together, then periodically turning over the mixture for purposes of aeration as the microorganisms in the mixture develop, and then flowing hot steam through the mixture to kill or deter the further development of certain types of bacteria and other organisms. Several variations of this process have been used, but in all cases the compost is treated in relatively small quantities or batches, and it has been extremely difficult to provide a standard pasteurized compost from one batch to another.

Attempts have been made to pasteurize in bulk large quantities of the mushroom compost, but for one reason or another such attempts have not been entirely successful. It is apparent that unless the entire mass of compost material is treated in essentially the same manner, the quality of the compost will vary from place to place within the mass. Where, for example, the compost mass is exposed to the atmosphere, the exposed surface material may become contaminated and eventually contaminate the entire batch. If on the other hand, a room is filled with the compost, those portions of the compost contacting the walls of the room are cooler than the rest of the mass and water condenses thereon making the adjacent portion of the compost undesirably moist. Moreover, air will not circulate through the portions of the compost mass in proximity to the walls and floor of the room wherefor the aerobic thermofils therein do not develop properly while an unwanted development of the anaerabic thermofils occurs.

Irrespective of the failures which have heretofore resulted from attempts to pasteurize in bulk large quantities of mushroom compost, I have found that bulk pasteurization is, nevertheless, the best way to produce economically mushroom compost of consistantly high quality and uniform composition. By carefully controlling the temperature and moisture content of the entire compost mixture while at the same time continuously aerating the mixture it is possible to enhance the growth of desirable aerobic organisms while discouraging the growth of undesirable anaerobic and other organisms.

SUMMARY OF THE INVENTION

Briefly, in accordance with the present invention large quantities of, for example, two-hundred cubic meters of ready to use mushroom compost, are prepared in bulk. The initial compost mixture comprising, for example, horse manure, hay, gypsum and other well known ingredients are composted in any known Phase I compositing process and well mixed, fluffed and placed in a pasteurization chamber of novel construction. The floor of the chamber has a perforate central section surrounded by a perforate fence spaced a substantial distance from the outer walls of the chamber. The space within the fence is preferably filled completely with the compost mixture. A mixture of air and steam is blown into a large space below the floor and thus flows more or less uniformly up through the floor and out through the entire pile of the compost mixture. A portion of the air and other gasses that exit the pile escape to the atmosphere. The amounts of steam and fresh air which are introduced into the recirculating gas are respectively adjustable to permit the operator to maintain optimum growth conditions for the development of the aerobic thermofils.

Inasmuch as the warm moist air and other gasses exit the compost pile through the sides as well as through the top, a uniformity of temperature and moisture is maintained throughout the entire compost pile. The large open space surrounding the compost pile eliminates the condensation of moisture on the exterior surfaces of the pile, which I believe, was one of the major faults in the prior attempts to pasteurize mushroom compost in bulk.

GENERAL DESCRIPTION OF THE DRAWING

The present invention will be better understood by a reading of the following detailed description taken in connection with the accompanying drawing wherein:

FIG. 1 is a schematic diagram of a pasteurization chamber and system for pasteurizing compost for use in the growing of Agaricus bisporus mushrooms;

FIG. 2 is an elevational view, taken in cross-section of a pasteurization chamber embodying the present invention; and FIG. 3 is a plan view of the pasteurization chamber of FIG. 2.

DETAILED DESCRIPTION OF THE INVENTION

Referring to FIG. 1 of the drawing, a pasteurization chamber 10 is provided in a room of an enclosure 12 having a floor 14 spaced from the bottom surface 16 of the room. The floor 14 has a central perforated portion 18 completely surrounded by an imperforate portion 20. A perforate fence 22 surrounds the central perforate portion 18 of the floor to contain a mass 24 of the compost during the Phase II pasteurization process. The bottom surface 16 slopes downwardly toward a drain 26 at one side of the room. A drain line having a U-shaped trap 28 therein carries liquid to a sewer or the like.

In order to aerate the compost mass or pile 24, and to control its temperature and humidity, a blower 30 is mounted above the chamber 10 and blows air down through a duct 32 into the space below the floor 14. The blower 30 has a first inlet to which air is supplied from the top of the chamber 10 through a control valve 34 and a second inlet to which fresh air is supplied through a filter 36 and a control valve 38. The enclosure 12 is provided with an exhaust port 40 from which those gasses which are not recirculated through the chamber 10 are exhausted to the atmosphere. The relative adjustments of the valves 34 and 38 determine the amount of fresh air which is introduced into the recirculated gas to support the growth of aerobic thermofils and to some extent to control the temperature of the compost.

The moisture content and temperature of the compost pile is controlled primarily by the introduction of steam into the gasses flowing through the duct 32 into the space below the floor 14. The amount of steam fed into the duct 32 is controlled by a valve 42 connected in the line between the steam nozzle and the source of steam. Preferably, the lower open end of the duct is located directly above the drain 26 so that the steam is partially dried as it traverses the path between the duct 32 and the compost pile, and the separated liquid flows out through the drain. Inasmuch as the fresh air inlet is above the steam outlet, in the event of a blower or power failure the steam entering the duct 32 flows up and out to the atmosphere rather than flowing through the compost pile. The latter condition could result in rapid deterioration and destruction of the entire compost pile.

In order to prepare a batch of compost in bulk, the fenced in space is filled with the compost mixture to a depth of about 2.5 meters. The valves 34 and 36 are adjusted and the blower 30 is operated to blow air into the space between the floor 14 and the bottom surface 16 of the room. Because the trap 28 in the drain line is normally filled with water, all of the air exiting the duct 32 flows upwardly through the perforated central floor section 18 and through the compost pile. The steam valve 42 is opened to emit live steam at a temperature of about 250° F., into the air stream from the blower. It will be understood by those skilled in the art that temperature sensing devices should be located at different positions in the compost pile to enable the operator to make any necessary adjustments of the valves 34, 38 and 42 to maintain optimum conditions for compost development. Because of the airspace surrounding the pile and because of the large space below the floor 14, the flow of air is substantially uniform throughout the entire compost pile. Moreover, the temperature is substantially uniform throughout the pile. Throughout most of the Phase II pasteurization process the temperature of the compost exceeds the temperature of the recirculated gas by no more than about 20° F. Initially the air temperature is held realtively high at about 140° F., until the compost temperature reaches about 132° F. The air temperature is then reduced to about 110° F. After about 48 hours the air temperature is again raised to about 142° F. for about three to six hours to insure that all undesirable organisms in the compost are killed. Thereafter, the air temperature is lowered to about 130° F. for the remainder of the process. These controlled temperature changes are readily made by varying the amount of steam injected into the duct 32.

Refer now to FIGS. 2 and 3 wherein is shown a Phase II pasteurization chamber and system which is now in use. As there shown, the perforate floor portion 18 is constituted by a plurality of wooden boards 46 which are secured in mutually parallel spaced relationship to a plurality of beams 48 resting on concrete columns 50. The floor portion 18 is about 33% open but it is believed that 25% open area could be used satisfactorily. The fence 22 is also constituted by spaced apart wooden boards and also has an open area of about 33%. The open area of the fence could, I believe, also be reduced to about 25%. The space beneath the floor 14 has a height of about one meter and the space above the floor 14 has a height of about three meters. The air space surrounding the fence 22 has a width of about one-half meter. It should be noted that all of the surfaces which come in direct contact with the compost are wood.

The enclosure or building 12, as best shown in FIG. 3, has an exterior door 54 at one end and a set of doors 56 at the opposite end. This door arrangement permits the initial filling of the chamber with one piece of equipment through one door and the removal of the final compost with another piece of equipment through the other door. In this way contamination of a fresh batch of compost mixture with organisms from the preceding batch is minimized.

As best shown in FIG. 2, the valves 34 and 38 are gate valves connected by a T-shaped duct section to the inlet at the side of the blower 36. For a room ten meters square by three meters high, I have found that a blower having a capacity of 4800 C.F.M. at eight inches pressure provides sufficient air volume and flow rate. As stated previously, the space below the floor 14 must be airtight except for the open area in the perforated central floor portion 18 to prevent any of the air, steam and other gasses from the duct 32 from bypassing the compost pile.

It will be understood that the particular recipes for the compost mixtures which are used depend on many factors and do not, therefore, constitute a part of the present invention. Horse manure and hay are, however, in most cases the principal ingredients, and the chamber of FIGS. 2 and 3 holds about 80 tons of the finalized compost. This large amount of compost can be Phase II pasteurized in bulk in about seven days in the chamber 10 without any handling of the compost other than to fill the fenced in area with the initial mixture and subsequently to remove the completed compost.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Apparatus for use in the bulk pasteurization and aeration of mushroom compost, comprising
   an enclosed room having a chamber therein,
   a floor spaced from the bottom of said room to provide a space below said floor,
   said floor having an imperforate peripheral portion surrounding a central perforate portion,
   an upright perforate wall extending upwardly from said floor in surrounding relationship with said central perforate portion,
   said wall being spaced from the sides of said room to provide a space within said room surrounding said wall,
   the imperforate peripheral portion of said floor defining the bottom of said space surrounding said wall and being connected to the sides of said room,
   a passageway connected between the top of said chamber and said space below said floor,
   blower means connected in said passageway for blowing air from the top of said chamber to said space below said floor and including
   a blower having an inlet and an outlet, an inlet duct forming a part of said passageway connected between said chamber and said inlet of said blower, and an outlet duct forming a part of said passageway connected between said outlet of said blower and said space below said floor,
   steam emitting means opening into said passageway downstream of said blower means for adding steam to the air blown into said space below said floor,
   a fresh-air inlet port opening into said inlet duct, for supplying fresh air to said outlet duct, valve means mounted between said fresh-air inlet port and a location outside said room for controlling the flow of fresh air into said outlet duct, valve means mounted in said inlet duct between the inlet of said blower and the interior of said room to control the flow of air from said chamber to said outlet duct, an open exhaust port carrying gases from said chamber to the ambient, the bottom of said room sloping downwardly toward a position below said outlet duct and a liquid drain located at the bottom of said room below said outlet duct.

2. The combination according to claim 1 comprising a U-shaped trap in said liquid drain to prevent the air from said outlet duct from exiting said room through said drain.

* * * * *